United States Patent
Lee

(10) Patent No.: US 8,643,205 B2
(45) Date of Patent: Feb. 4, 2014

(54) WIND POWER GENERATOR

(76) Inventor: Mu Il Lee, Gyeonggi-Do (KR)

(*) Notice: Subject to any disclaimer, the term of this patent is extended or adjusted under 35 U.S.C. 154(b) by 0 days.

(21) Appl. No.: 13/444,564

(22) Filed: Apr. 11, 2012

(65) Prior Publication Data

US 2013/0099498 A1    Apr. 25, 2013

Related U.S. Application Data

(63) Continuation of application No. PCT/KR2010/006842, filed on Oct. 7, 2010.

(30) Foreign Application Priority Data

Nov. 3, 2009  (KR) .................. 10-2009-0105325

(51) Int. Cl.
  *B60L 11/12*  (2006.01)
  *H02P 9/04*  (2006.01)
(52) U.S. Cl.
  USPC ........................................... 290/50
(58) Field of Classification Search
  USPC .................... 290/50, 55, 44, 54, 43
  See application file for complete search history.

(56) References Cited

U.S. PATENT DOCUMENTS

| 7,032,859 B2 | 4/2006 | Mohr | |
| 7,205,678 B2 * | 4/2007 | Casazza et al. | 290/55 |
| 2007/0177970 A1 * | 8/2007 | Yokoi | 415/4.2 |

FOREIGN PATENT DOCUMENTS

| JP | 09-233745 A | 9/1997 |
| JP | 2009-036064 A | 2/2009 |
| KR | 10-2006-0062248 | 12/2006 |

* cited by examiner

*Primary Examiner* — Javaid Nasri
(74) *Attorney, Agent, or Firm* — Edwards Wildman Palmer LLP

(57) ABSTRACT

A wind-power generator which can improve the performance of a battery and/or a storage battery for a vehicle. The wind-power generator includes: a cylindrical accommodating member having a cutout hole formed by cutting out a portion thereof and an inner surface along which coil bundles are spaced apart from each other; a rotary member which is rotatably accommodated in the accommodating member, the N- and S-pole magnetism of which is alternately arranged along the circumferential direction of the accommodating member such that a portion of the rotary member is exposed to the outside through a cutout hole; and a storage battery electrically connected to the rotary member so as to be directly charged with the electrical energy generated by the rotation of the rotary member. In the present invention, electrical energy is generated using wind power which is a natural energy source, thus protecting the environment in an environmentally-friendly manner.

4 Claims, 1 Drawing Sheet

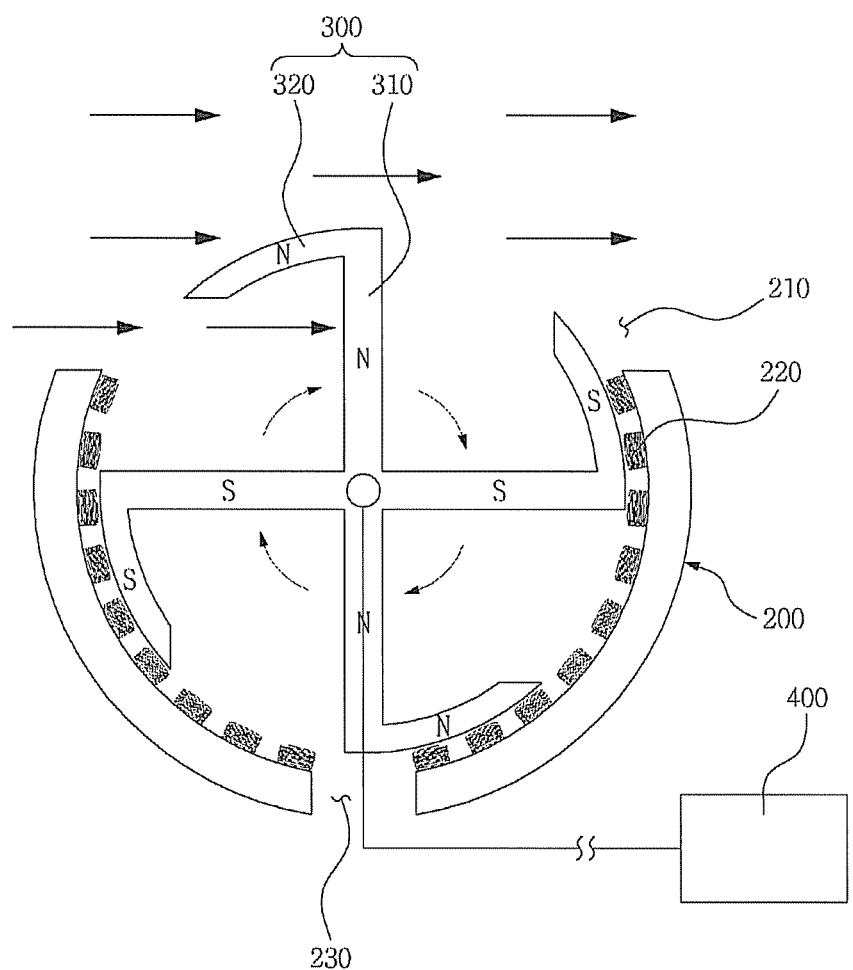

WIND POWER GENERATOR

CROSS-REFERENCE TO RELATED APPLICATION

This application is a continuation of PCT/KR2010/006842 filed Oct. 7, 2010, which claims priority to Korean Patent Application No. 10-2009-0105325 filed Nov. 3, 2009, which applications are incorporated by reference herein.

TECHNICAL FIELD

The present invention relates to a wind-power generator that generates electrical energy using wind power which is a natural energy source, thus protecting the environment in an environment-friendly manner.

BACKGROUND ART

Recently, automobile ownership per household has increased due to such advantages as convenient long distance travel and quick transportation. As a result, there are more than 17 million automobiles in the country and 7.25 billion (725,000,000) worldwide, which means that the automobile ownership per household is equal to or greater than one.

The increase in the number of automobiles has caused a corresponding increase in the consumption of fuel such as gasoline, diesel oil, liquefied petroleum gas (LPG). However, the reserves of oil resources are finite. Accordingly, there is a growing concern that, should the current trend oil consumption continue, oil resources will be exhausted in over half a century. Moreover, exhaust fumes from automobiles are a primary cause of air pollution and thus are responsible for various environmental issues such as global warming.

SUMMERY OF THE DISCLOSURE

The present invention is made in view of these circumstances and an object of the invention is to provide an environment-friendly wind-power generator that can generate electrical energy with a simple construction capable of using wind power.

A wind-power generator that can achieve the above object of the invention is characterized by a construction including: a cylindrical accommodating member which has a cut hole formed by cutting out a portion thereof and has an inner surface along which coil bundles are arranged at intervals; a rotary member which is rotatably accommodated in the accommodating member, configured to alternately exhibit N- and S-pole magnetism in a circumferential direction of the accommodating member, and partially exposed to the outside through the cutout hole; and a storage battery electrically connected to the rotary member so as to be directly charged with electrical energy generated by the rotation of the rotary member.

Herein, the rotary member is characterized by having a cross shape and by including a rotating body rotatably coupled to an inner portion of the accommodating member and an extension piece that extends by a predetermined length from an end of the rotating body in a direction opposite the direction of rotation of the rotating body.

The extension piece is characterized by being curved in a manner that conforms to the inner surface of the accommodating member.

The accommodating member is characterized by having a discharge hole in a lower surface thereof to discharge water or impurities introduced into the inside of the accommodating member.

As discussed above, the wind-power generator according to the present invention has the effect of generating electrical energy with a simple construction that is capable of wind power, thereby protecting the environment in an environment-friendly manner.

BRIEF DESCRIPTION OF DRAWINGS

FIG. 1 is a plan view illustrating the structure of a wind-power generator according to one embodiment of the present invention.

EXPLANATION OF LETTERS AND NUMERALS OF MAIN COMPONENTS

| | |
|---|---|
| 110: opening | 200: accommodating member |
| 210: cutout hole | 220: coil |
| 230: discharge hole | 300: rotary member |
| 310: rotating body | 320: extension piece |
| 400: storage battery | |

DETAILED DESCRIPTION OF THE DISCLOSURE

Hereinafter, a wind-power generator according to one embodiment of the present invention will be described with reference to the accompanying drawings.

FIG. 1 is a plan view illustrating the structure of a wind-power generator according to one embodiment of the present invention.

As illustrated in FIG. 1, a wind-power generator according to one embodiment of the present invention includes an accommodating member 200 which has a cutout hole 210 formed by partially cutting out a portion thereof, and coil bundles 220 arranged at intervals on the inner surface thereof. The wind-power generator further includes: a rotary member 300 which is rotatably accommodated in the accommodating member 200, is configured to alternately exhibit N- and S-pole magnetism in a circumferential direction of the accommodating member 200, and is partially exposed to the outside through the cutout hole 210; and a storage battery 400 that is electrically connected to the accommodating member 200 to be directly charged with electrical energy generated by the rotation of the rotary member 300.

As the number of turns of coil wound in the coil bundle 220 is larger and the coil bundles 220 are more densely arranged with a smaller pitch therebetween, the amount of the generated electrical energy becomes larger. A lower surface of the accommodating member 200 has a discharge hole 230 which is for discharging water or impurities that had been introduced into the inside of the accommodating member 200 to outside of the accommodating member 200.

In greater detail, the shape of the rotary member 300 is a cross shape. The rotary member includes a rotating body 310, the center of which is coupled to an inner portion of the accommodating member 200 to make the rotating body 310 rotatable in the accommodating member 200, and an extension piece 320 that extends by a predetermined length from an end of the rotating body 310 in a direction opposite the direction of rotation of the rotating body 310.

At the position of the rotating center at which the rotating body 310 rotates, the magnetism of the rotating body 310, which extends toward the inside of the accommodating member 200, and the magnetism of the extension piece 320 provided at the end of the rotating body 310 are the magnetism of the same poles. However, in each of the rotating body 310 and the extension piece 320, the different magnetisms are alternately present along the direction of rotation thereof.

That is, imparting the extension piece 320 with a curved surface conforming to the inner surface of the accommodating member 200 is an effective method for allowing the N-pole and the S-pole to be alternately arranged to produce electrical energy, for increasing the area where the extension piece 320 faces the coil bundles 220, and for increasing the rotational speed.

In order to generate as large of an amount of electrical energy as possible, the extension piece 320 provided at the end of the rotating body 310 is located as closely as possible to the coil bundle 220 in the accommodating member 200. Given this structure, adjusting the length of the rotating body 310 is an effective method.

The operation of the wind-power generator having the above-described structure will be described below.

Wind introduced into the accommodating member 200 causes rotary motion of the rotating body 300. As the rotating body 300 rotates, magnetic induction occurs between the extension piece 320 and the coil bundle 220 provided in the accommodating member 200, producing electrical energy.

The produced electrical energy is stored in the storage battery 400 electrically connected to the accommodating member 200 so that the produced electrical energy can be used by connecting an electronic apparatus to the storage battery 400 if necessary.

On rainy days or in weather where the impurities in the air are large, water such as rain drops or snow, or impurities may enter the accommodating member 200. The water or impurities introduced into the accommodating member 200 move down to the bottom along the curved inner surface of the accommodating member 200 and are discharged out of the accommodating member 200 through the discharge hole 230. Accordingly, the water or impurities do not exert an influence on the rotary motion of the rotating body 300.

It should be understood that the embodiment of the present invention may be changed, altered, or modified to a variety of embodiments without departing from the technical scope of the present invention, and the changes, alterations and modifications may fall within the technical scope and spirit of the present invention based on the construction of the claims.

The invention claimed is:

1. A wind-power generator comprising:
   an accommodating member having a cylindrical shape, a cutout hole formed by partially cutting out a portion of the accommodating member, and coil bundles arranged at intervals along an inner surface of the accommodating member;
   a rotary member rotatably accommodated in the accommodating member, configured to alternately exhibit N-pole magnetism and S-pole magnetism in a circumferential direction of the accommodating member, and partially exposed to an outside through the cutout hole; and
   a storage battery electrically connected to the rotary member so as to be directly charged with electrical energy generated when wind introduced into the accommodating member causes the rotary member to be rotated.

2. The wind-power generator according to claim 1, wherein the rotary member has a cross shape and includes a rotating body rotatably coupled to an inner portion of the accommodating member and an extension piece extending by a predetermined length from an end of the rotating body in a direction opposite to a direction of rotation of the rotating body.

3. The wind-power generator according to claim 2, wherein the extension piece has a curved shape conforming to the inner surface of the accommodating member.

4. The wind-power generator according to claim 3, wherein a lower surface of the accommodating member is provided with a discharge hole to discharge to an outside of the accommodating member water or an impurity that has been introduced into the accommodating member.

\* \* \* \* \*